United States Patent Office 3,842,091
Patented Oct. 15, 1974

3,842,091
DIBENZOXIRENAZEPINE DERIVATIVES
Kenya Kawashima and Toshihiro Ishiguro, Osaka, Japan, assignors to Takeda Chemical Industries, Ltd., Osaka, Japan
No Drawing. Filed Sept. 25, 1972, Ser. No. 291,627
Claims priority, application Japan, Sept. 30, 1971, 46/76,971; July 24, 1972, 47/74,448; July 28, 1972, 47/76,324
Int. Cl. C07d 41/08
U.S. Cl. 260—348 C                12 Claims

ABSTRACT OF THE DISCLOSURE

Novel compounds of the formula,

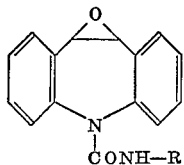

wherein R stands for a hydrogen atom, a lower alkyl group, a lower alkyl amino lower alkyl group, an aralkyl group, an aryl group or an amino group, have anti-convulsive, anti-epileptic, anti-trigeminal neuralgia and anti-arrhythmia activities.

The present invention relates to novel dibenzoxirenazepine derivatives having strong anti-convulsive, anti-epileptic, anti-trigeminal neuralgia and anti-arrhythmia activities. More concretely, the present invention relates to a compound represented by the following formula (I)

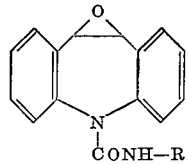

wherein, R stands for a hydrogen atom, a lower alkyl group, a lower alkyl amino lower alkyl group, an aralkyl group, an aryl group or an amino group.

Hitherto, carbamazepine and 1,1a,6,10b-tetrahydrocyclopropa[d]dibenz[b,f]azepine - 6 - carboxamide have been known as anti-convulsive agents. The compounds of this invention have a more effective anti-convulsive action than the known compounds.

In the formula (I), the lower alkyl group represented by R is exemplified by alkyl such as methyl, ethyl, n-propyl or isopropyl. The lower alkyl amino lower alkyl group represented by R is exemplified by dimethylaminopropyl, diethylaminopropyl, dimethylaminomethyl, diethylaminoethyl or dipropylaminopropyl. The aralkyl group represented by R is exemplified by benzyl, phenethyl or henylpropyl. The aryl group represented by R is exemplified by phenyl, tolyl, or xylyl.

The compound of the formula (I) can be produced by, for example, the following steps.

The compound of the formula (I) wherein R is a lower alkyl group, and aralkyl group or aryl group is produced by reacting a compound represented by the formula (II)

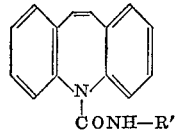

wherein R' is a lower alkyl group, an aralkyl group or aryl group with an organic peracid (Step A).

The compound of the formula (I) is produced by reacting a compound represented by the formula (III)

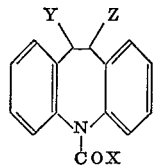

wherein X stands for a halogen atom such as chlorine, bromine, iodine or fluorine and Y is a halogen atom and Z is a hydroxyl group or Y forms an epoxy group together with Z, with an amine represented by the formula (IV)

$$R-NH_2 \qquad (IV)$$

wherein R has the same meaning as defined above (Step B).

In Step A, an organic peracid is used in an amount of more than about one mole equivalent, more preferably, from one mole equivalent to 20 mole equivalents relative to the compound (II).

The said organic peracid is exemplified by aliphatic organic peracids (e.g. performic acid, peracetic acid, perpropionic acid, per-n-butyric acid, perisobutyric acid, peradipic acid, trichloroperacetic acid, trifluoroperacetic acid or monopermaleic acid), or aromatic organic peracids (e.g. perbonzoic acid, m-chloroperbonzoic acid, p-nitroperbenzoic acid or monoperphthalic acid). Instead of the use of an organic peracid itself, Step A may be conducted under such conditions that the organic peracid is generated in the reaction system. For instance, it is convenient to employ a combination of (1) e.g. carboxylic acid or carboxylic anhydride and (2) e.g. hydrogen peroxide. The reaction in Step (A) preferably proceeds in a conventional solvent which does not hinder the intended reaction, such as halogenated hydrocarbons (e.g. dichloromethane, chloroform, carbon tetrachloride or 1,2-dichloroethane), aromatic hydrocarbons (e.g. benzene, toluene or xylene), fatty acids (e.g. acetic acid), ethers (e.g. ethyl ether or tetrahydrofuran), alcohols (e.g. methanol or ethanol), ketones (e.g. acetone or methyl ethyl ketone). Above all halogenated hydrocarbons and aromatic hydrocarbons are used advantageously. The reaction can proceed advantageously by using an acid catalyst, such as sulfuric acid, phosphoric acid, activated alumina, or by adding an organic peracid stabilizer such as unsaturated phosphoric esters (e.g. di-2-butenyl 2-ethylhexyl phosphate, dioctyl 3-pentenyl phosphate).

The reaction is carried out in general at a temperature ranging from −10° C. to 150° C., preferably from 0° C. to 100° C.

In Step B, the reaction is carried out in the absence or in the presence of a solvent such as alcohols (e.g. methanol, ethanol, propanol or pentanol), benzene, toluene, xylene, ethyl ether, chloroform or a mixture of two or more of them. The reaction is carried out at a temperature ranging from −10° C. to 200° C., preferably from 0° C. to 150° C.

In the reaction of the amine (IV) with the compound (III) wherein Y is a halogen atom and Z is a hydroxyl group, at least one mole of the amine and not less than 2 moles, preferably 2 moles to 60 moles, of an acid acceptor, respectively relative to one mole of the compound (III), may be employed. As an acid-acceptor, the amine itself or any other basic substance such as trialkylamine (e.g. triethylamine, trimethylamine, tripropylamine, tributylamine or trihexylamine), alkali carbonate (e.g. sodium carbonate or potassium carbonate) or alkali hydrogen carbonate (e.g. sodium hydrogen carbonate or potassium hydrogen carbonate) may be used.

In the reaction of the amine (IV) with the compound (III) wherein Y forms an epoxy group together with Z, at least one mole of the amine and not less than one mole, preferably one mole to 60 moles, of the acid acceptor, respectively relative to one mole of the compound (III), may be employed.

The amine (IV) may be used as a free-form or as an acid-addition salt. In case of using the amine salt, the reaction is preferably carried out in the presence of an alkali which makes the amine salt free. Examples of the said alkali are the same as those of the said basic substance. The reaction time is generally about 30 minutes to several hours. After completion of the reaction, the product may be separated through *per se* conventional manner, e.g. distillation of the solvent, separation, purification or extraction with an organic solvent (e.g. chloroform or ethanol).

One of the starting compounds of the formula (III) in which Y forms an epoxy group together with Z is obtained by, for example, reacting a compound represented by the formula (V)-

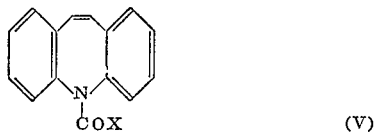

wherein X has the same meaning as defined above with an organic peracid. The reaction may be conducted in a similar manner to the Step A.

Another starting compound of the formula (III), in which Y is a halogen atom and Z is a hydroxyl group, is obtained by, for example, allowing a reaction product between a compound (V) and an organic peracid to react with a hydrohalogenic acid.

The hydrohalogenic acid is exemplified by hydrochloric acid, hydrobromic acid or hydriodic acid, and is used at least one mole, preferably one mole to 5 moles relative to one mole of the reaction product between a compound (V) and an organic peracid.

The reaction is carried out in any solvent which does not hinder the reaction, which is exemplified by aromatic hydrocarbons (e.g. benzene or toluene), ethers (e.g. ethyl ether, tetrahydrofuran or dioxane), esters (e.g. ethyl acetate). The reaction is generally completed by refluxing for about 1 hour.

The compound (I) is useful as an agent for the treatment of, for example, convulsion, epilepsy, trigeminal neuralgia or errhythmia, and its usual daily dosage for a safe administration to an adult human is in the range of about 200 to 1,500 milligrams in such a form as tablet, powder, granule, capsule, liquid, injection, etc.

For further explanation of the present invention, the following examples are given, wherein the relationship between "part(s) by weight" and "part(s) by volume" corresponds to the relationship between "gram(s)" and "milliliter(s)."

EXAMPLE 1

To 2.56 parts by weight of 5H-dibenz[b,f]azepine-5-carbonyl chloride are added 26 parts by volume of ethanol and 2.36 parts by weight of n-propylamine. The mixture is refluxed for 50 minutes. The reaction solution is concentrated under reduced pressure to dryness. To the residue are added 30 parts by volume of ethyl acetate and 20 parts by volume of water, then the mixture is shaken. The organic layer is separated and washed with water twice and with a saturated sodium chloride solution, successively. So-washed solution is dried with sodium sulfate, and concentrated under reduced pressure to leave a dry cystalline substance, which is recrystallized from hexane-benzene (2:1 v./v.) to obtain 2.12 parts by weight of N-propyl-5H-dibenz[b,f]azepine-5-carboxamide (yield: 76.3%). Melting point: 137°–139° C.

In a similar manner to the above, the following compounds are obtained as shown in Table 1.

TABLE 1

| Starting compounds | Resulting compounds | Recrystallizing solvent | Melting point (° C.) |
|---|---|---|---|
| 5H-dibenz[b,f]azepine-5-carbonyl chloride plus benzylamine. | N-benzyl-5H-dibenz[b,f]-azepine-5-carboxamide. | Methanol | 137–140 |
| 5H-dibenz[b,f]azepine-5-carbonyl chloride plus methylamine. | N-methyl-5H-dibenz[b,f]-azepine-5-carboxamide. | do | 202–204 |
| 5H-dibenz[b,f]azepine-5-carbonyl chloride plus p-toluidine. | N-p-tolyl-5H-dibenz[b,f]-azepine-5-carboxamide. | Chloroform-methanol. | 192–195 |

In 20 parts by volume of chloroform is dissolved 1.181 part by weight of 5H-dibenz[b,f]azepine-5-carboxamide. To the solution is added 0.057 part by weight of anhydrous sodium acetate, then the mixture is sufficiently stirred. To the solution is further added 1.07 part by volume (including 0.66 part by weight of peracetic acid) of a 40% acetic acid solution of peracetic acid and the mixture is stirred for about one minute at room temperature, then left standing for 10 days in a refrigerator (0°–5° C.). The reaction mixture is cooled with ice, and pH of the solution is adjusted to 5–6 with 1 N NaOH, to which is added 10 parts by volume of a 5% aqueous solution of sodium hydrogen sulfite. After iodo-starch reaction of the reaction mixture is confirmed to be negative, 15 parts by volume of a saturated solution of sodium hydrogen carbonate and 10 parts by volume of chloroform are added thereto. The mixture is shaken in a separating funnel, and the chloroform layer is separated, which is shaken with 10 parts by volume of a saturated solution of sodium hydrogen carbonate. The chloroform layer washed with 10 parts by volume of water and dried with anhydrous sodium sulfate. The chloroform is distilled off under reduced pressure at a temperature not higher than 40° C. to leave 1.62 part by weight of residue. Analysis of the residue by nuclear magnetic resonance spectroscopic method shows 31.5% yield of the desired compound. Further, the residue is subjected to column chromatography on 35 parts by weight of silica gel, using a mixed solvent of chloroform-acetone-ethanol (90:10:2) as the eluent and then the eluate is distilled off, whereby 0.318 part by weight of 1a,10b-dihydro-6H-dibenz[b,f] oxiren[d]azepine-6-carboxamide is obtained. Melting point of the product recrystallized from ethanol is 193° C. (with decomposition).

In a similar manner to the above, the following compounds are obtained as shown in Table 2.

TABLE 2

| Starting compound | Resulting compound | Recrystallizing solvent | Melting point (° C.) |
|---|---|---|---|
| N-benzyl-5H-dibenz[b,f]azepine-5-carboxamide plus m-chloroperbenzoic acid. | N-benzyl-1a,10b-dihydro-6H-dibenz[b,f]-oxiren[d]azepine-6-carboxamide. | Ethyl acetate-chloroform. | 167–168.5 |
| N-propyl-5H-dibenz[b,f]azepine-5-carboxamide plus m-chloroperbenzoic acid. | 1a,10b-dihydro-N-propyl-6H-dibenz[b,f]oxiren[d]-azepine-6-carboxamide. | Ethyl acetate | 128–130 |
| N-p-tolyl-5H-dibenz[b,f]azepine-5-carboxamide plus m-chloroperbenzoic acid. | 1a,10b-dihydro-N-p-tolyl-6H-dibenz[b,f]oxiren[d]azepine-6-carboxamide. | Ethanol | 180–182 |

In a similar manner to Example 1, 1a,10b-dihydro-N-methyl - 6H-dibenz[b,f]oxiren[d]azepine-6-carboxamide is obtained as an oily substance by reacting N-methyl-5H-dibenz[b,f]azepine - 5 - carboxamide with m-chloroperbenzoic acid. Treatment of the oily substance with methanol gives amorphous substance.

IR (Nujol) cm.$^{-1}$: 1685, 1654 (—CONHCH$_3$)

NMR(CDCl$_3$) p.p.m.: 4.23 (2H, s, ), 2.77 (3H, d, J=5 c/s, C$\underline{H}_3$NH—), 7.37 (8H, br. s.)

EXAMPLE 2

To 6.2 parts by weight of 5H-dibenz[b,f]azepine-5-carbonyl chloride dissolved in 60 parts by volume of chloroform is added 6.4 parts by weight of m-chloroperbenzoic acid and the mixture is refluxed for 5 hours. To the reaction solution are added 60 parts by volume of chloroform, 35 parts by volume of a saturated sodium hydrogen carbonate solution and 40 parts by volume of 5% sodium hydrogen sulfite. The mixture is sufficiently shaken. The chloroform layer is washed with water and dried over anhydrous sodium sulfate, followed by evaporating off the solvent under reduced pressure. The thus obtained dry residue is recrystallized from ethyl acetate-chloroform to give 5.75 parts by weight of colorless flakes (yield: 87.3%). This compound is confirmed to be 1a,10b-dihydro - 6H - dibenz[b,f]oxiren[d]azepine - 6-carbonyl chloride. Melting point: 205°–207° C.

In 30 parts by volume of ethanol is dissolved 0.305 part by weight of 1a,10b - dihydro-6H-dibenz[b,f]oxiren[d]azepine - 6 - carbonyl chloride, and the reaction is allowed to occur under reflux for one hour while bubbling gaseous ammonia into the solution. Then, the solvent is distilled off under reduced pressure, to leave white residue, to which are added 15 parts by volume of chloroform and 10 parts by volume of water. The mixture is shaken. The chloroform layer is dried with anhydrous sodium sulfate and the solvent is distilled off. Recrystallization of the residue from ethanol gives 0.284 part by weight (yield: 87.7%) of 1a,10b-dihydro-6H-dibenz[b,f]oxiren[d]azepine - 6 - carboximide. Melting point: 195°–197° C. (decomposition).

In a similar manner to Example 2, various compounds are produced as shown in the following Table 3.

TABLE 3

| Starting compounds | Resulting compounds | Recrystallizing solvent | Melting point (° C.) |
|---|---|---|---|
| 1a,10b-dihydro-6H-dibenz[b,f]oxiren[d]azepine-6-carbonyl chloride plus n-propylamine. | 1a,10b-dihydro-N-propyl-6H-dibenz[b,f]oxiren[d]azepine-6-carboxamide. | Ethyl acetate | 128–130 |
| 1a,10b-dihydro-6H-dibenz[b,f]oxiren[d]azepine-6-carbonyl chloride plus p-toluidine. | 1a,10b-dihydro-N-p-tolyl-6H-dibenz[b,f]oxiren[d]-azepine-6-carboxamide. | Ethanol | 180–182 |
| 1a,10b-dihydro-6H-dibenz[b,f]oxiren[d]azepine-6-carbonyl chloride plus hydrazine hydrate. | 1a,10b-dihydro-6H-dibenz[b,f]oxiren[d]azepine-6-carboxylic acid hydrazide. | Ethyl acetate-chloroform. | 185–187 |
| 1a,10b-dihydro-6H-dibenz[b,f]oxiren[d]azepine-6-carbonyl chloride plus N,N-dimethyl-1,3-propanediamine. | 1a,10b-dihydro-N-[3-(dimethylamino)propyl]-6H-dibenz[b,f]oxiren[d]azepine-6-carboxamide. | Ethyl acetate | 141–143 |
| 1a,10b-dihydro-6H-dibenz[b,f]oxiren[d]azepine-6-carbonyl chloride plus benzylamine. | N-benzyl-1a,10b-dihydro-6H-dibenz[b,f]oxiren[d]azepine-6-carboxamide. | Ethyl acetate-chloroform. | 167–168.5 |

In a similar manner to Example 2, 1a,10b-dihydro-N-methyl - 6H - dibenz[b,f]oxiren[d]azepine - 6 - carboxamide is obtained as an oily substance by reacting 1a,10b-dihydro - 6H - dibenz[b,f]oxiren[d]azepine-6 - carbonyl chloride with methylamine. Treatment of the oily substance with methanol gives amorphous substance.

IR (Nujol) cm.$^{-1}$: 1685, 1654 (—CONHCH$_3$)

NMR(CDCl$_3$) p.p.m.: 4.23 (2H, s, ), 2.77 (3H, d., J=5 c./s. C$\underline{H}_3$NH—), 7.37 (8H, br. s.).

EXAMPLE 3

In 10 parts by volume of tetrahydrofuran is dissolved in 2 parts by weight of 1a,10b - dihydro-6H-dibenz[b,f]oxiren[d]azepine-6-carbonyl chloride obtained in Example 2. To the solution is added 0.7 part by volume of 48% hydrobromic acid, and the mixture is refluxed for 1 hour. The reaction solution is concentrated, then water is added thereto. The mixture is shaken with chloroform. The chloroform layer is separated and dried, followed by distilling off the solvent to give white powder. Recrystallization of the white powder from methanol gives 1.36 part by weight of 10-bromo-10,11-dihydro-11-hydroxy-5H-dibenz[b,f]azepine - 5 - carbonyl chloride. Melting point: 147°–148° C.

To 30 parts by volume of 10% methanolic ammonia is added 0.572 part by weight of 10-bromo-10,11-dihydro-11 - hydrox - 5H-dibenz[b,f]azepine-5-carbonyl chloride. The mixture is stirred for 1 hour at a room temperature. The solvent is distilled off under reduced pressure. To the residue is added 10 parts by volume of water, and the mixture is shaken with 30 parts by volume of chloroform. The chloroform layer is separated, and concentrated to dryness. The residue is crystallized from ethanol to give 0.297 part by weight of 1a,10b - dihydro-6H-dibenz[b,f]oxiren[d]azepine-6-carboxamide.

Melting point: 195°–197° C. (decomp.).
Infrared spectrum (Nujol) cm.$^{-1}$: 3475–3150

(—CONH$_2$)
1670, 1591 (>N—CONH$_2$).

Nuclear magnetic resonance spectrum (CDCl$_3$ 60 Mc) p.p.m.: 4.22 (2H, singlet), 4.65 (2H), 7.1–7.6 (8H, multiplet).

In a similar manner to Example 3, 1a,10b-dihydro-N-propyl-6H-dibenz[b,f]oxiren[d]azepine - 6-carboxamide is obtained by reacting 10-bromo-10,11-dihydro-11-hydroxy-5H-dibenz[b,f]azepine-5-carbonyl chloride with n-propylamine. Melting point: 128°–130° C.

In a similar manner to Example 3, 10-chloro-10,11-dihydro-11-hydroxy-5H-dibenz[b,f]azepine - 5 - carbonyl chloride is obtained by reacting 1a,10b-dihydro-6H-dibenz[b,f]oxiren[d]azepine-6-carbonylchloride with hydrochloric acid, followed by recrystallization from methanol. Melting point: 165°–167° C.

In a similar manner to Example 3, 1a,10b-dihydro-6H-dibenz[b,f]oxiren[d]azepine-6-carboxamide is obtained by reacting 10-chloro-10,11-dihydro-11-hydroxy-5H - dibenz[b,f]azepine-5-carbonyl chloride with ammonia. Melting point: 195°–197° C. (decomp.)

What we claim is:

1. A compound represented by the formula:

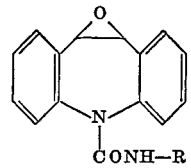

wherein R stands for a hydrogen atom, a lower alkyl group, a lower alkyl amino lower alkyl group, a phenyl C$_1$–C$_3$ alkyl group, a phenyl, tolyl or xylyl group or an amino group or its pharmaceutically acceptable salt.

2. A compound as claimed in claim 1, wherein R is a hydrogen atom.

3. A compound as claimed in claim 1, wherein R is a lower alkyl group.

4. A compound as claimed in claim 1, wherein R is a lower alkyl amino lower alkyl group.

5. A compound as claimed in claim 1, wherein R is a phenyl $C_1$–$C_3$ alkyl group.

6. A compound as claimed in claim 1, wherein R is a phenyl, tolyl or xylyl group.

7. A compound as claimed in claim 3, wherein the compound is 1a,10b-dihydro-N-propyl-6H-dibenz[b,f]oxiren[d]azepine-6-carboxamide.

8. A compound as claimed in claim 3, wherein the compound is 1a,10b-dihydro-N-methyl-6H-dibenz[b,f]oxiren[d]azepine-6-carboxamide.

9. A compound as claimed in claim 6, wherein the compound is 1a,10b-dihydro-N-p-tolyl-6H-dibenz[b,f]oxiren[d]azepine-6-carboxamide.

10. A compound as claimed in claim 1, wherein the compound is 1a,10b-dihydro-6H-dibenz[b,f]oxiren[d]azepine-6-carboxylic acid hydrazide.

11. A compound as claimed in claim 4, wherein the compound is 1a,10b-dihydro-N-[3-(dimethylamino)propyl]-6H-dibenz[b,f]oxiren[d]azepine-6-carboxamide.

12. A compound as claimed in claim 5, wherein the compound is N - benzyl - 1a,10b-dihydro-6H-dibenz[b,f]oxiren[d]azepine-6-carboxamide.

References Cited
UNITED STATES PATENTS 2,730,531   1/1956   Payne et al. _____ 260—348 A

FOREIGN PATENTS 948,304   1/1964   Great Britain _____ 260—348 A

NORMA S. MILESTONE, Primary Examiner

U.S. Cl. X.R.

260—239 D; 424—244